(12) United States Patent
Desai et al.

(10) Patent No.: US 10,740,454 B2
(45) Date of Patent: *Aug. 11, 2020

(54) TECHNOLOGIES FOR USB CONTROLLER STATE INTEGRITY PROTECTION WITH TRUSTED I/O

(71) Applicant: Intel Corporation, Santa Clara, CA (US)

(72) Inventors: Soham Jayesh Desai, Atlanta, GA (US); Pradeep Pappachan, Hillsboro, OR (US); Reshma Lal, Hillsboro, OR (US); Siddhartha Chhabra, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 15/856,576

(22) Filed: Dec. 28, 2017

(65) Prior Publication Data

US 2019/0042729 A1     Feb. 7, 2019

(51) Int. Cl.
*G06F 13/38* (2006.01)
*G06F 12/14* (2006.01)
*G06F 21/57* (2013.01)
*G06F 21/52* (2013.01)
*G06F 21/53* (2013.01)
*G06F 21/82* (2013.01)

(52) U.S. Cl.
CPC .......... *G06F 21/52* (2013.01); *G06F 12/1441* (2013.01); *G06F 13/382* (2013.01); *G06F 21/53* (2013.01); *G06F 21/82* (2013.01); *G06F 21/57* (2013.01)

(58) Field of Classification Search
CPC .... G06F 21/52; G06F 12/1441; G06F 13/382; G06F 21/53; G06F 21/57
See application file for complete search history.

(56) References Cited

U.S. PATENT DOCUMENTS 6,163,793 A * 12/2000 Gerber ................. G06F 9/3879
712/E9.068
2004/0193757 A1* 9/2004 Creta .................. G06F 13/4027
710/33

(Continued)

*Primary Examiner* — Alexander Lagor
*Assistant Examiner* — Howard H. Louie
(74) *Attorney, Agent, or Firm* — Barnes & Thornburg LLP

(57) ABSTRACT

Technologies for USB controller state integrity protection with trusted I/O are disclosed. A computing device includes an I/O controller, a channel identifier filter, and a memory. The I/O controller generates a memory access to controller state data in a scratchpad buffer in the memory. The memory access includes a channel identifier associated with the I/O controller. The channel identifier filter determines whether a memory address of the memory access is included in a range of a processor reserved memory region associated with the channel identifier. A processor of the computing device may copy the controller state data to a memory buffer outside of the processor reserved memory region. The computing device may reserve an isolated memory region in the memory that includes the processor reserved memory region. Secure routing hardware of the computing device may control access to the isolated memory region. Other embodiments are described and claimed.

25 Claims, 5 Drawing Sheets

(56) References Cited

U.S. PATENT DOCUMENTS

| | | | |
|---|---|---|---|
| 2006/0218336 A1* | 9/2006 | Ishizawa | G06F 13/4022 |
| | | | 710/316 |
| 2008/0162802 A1* | 7/2008 | Akiyama | G06F 12/0207 |
| | | | 711/105 |
| 2009/0254680 A1* | 10/2009 | Pfister | G06F 13/385 |
| | | | 710/3 |
| 2010/0042759 A1* | 2/2010 | Srinivasan | G06F 12/0607 |
| | | | 710/35 |
| 2015/0347051 A1* | 12/2015 | Kruglick | G06F 3/0622 |
| | | | 711/163 |
| 2016/0322110 A1* | 11/2016 | Abiko | G11C 16/24 |
| 2016/0378169 A1* | 12/2016 | Naeimi | G06F 1/3275 |
| | | | 713/323 |

* cited by examiner

TECHNOLOGIES FOR USB CONTROLLER STATE INTEGRITY PROTECTION WITH TRUSTED I/O

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data for a given computing device while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary.

Typical universal serial bus (USB) controllers may use a system memory buffer as a scratchpad, for example to cache state information or for other internal processes. The scratchpad buffers may be accessible by software with sufficient privileges, such as an untrusted operating system.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
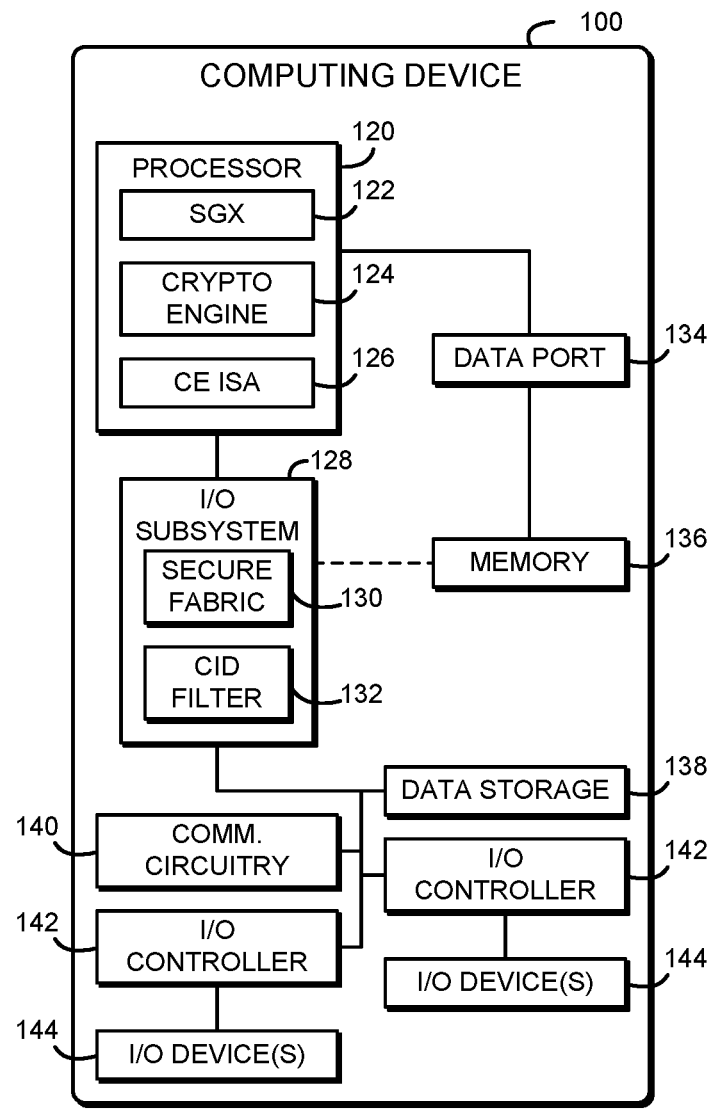
FIG. 1 is a simplified block diagram of at least one embodiment of a computing device for USB controller state integrity protection with trusted I/O.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for USB controller state integrity protection with trusted I/O is shown. In use, as described further below, the computing device 100 includes a USB controller that may access controller state data stored in a scratchpad buffer located in memory of the computing device 100. The scratchpad buffer is located within a trusted I/O processor reserved memory (TIO PRM) region, and the USB controller asserts a channel identifier (CID) with every transaction that accesses the scratchpad buffer. An inline CID filter verifies that transactions including the CID associated with the USB controller are directed toward a range within the TIO PRM associated with that CID. Software executed by the processor cannot access the TIO PRM range. Additionally, in some embodiments, the TIO PRM may also be included in an isolated memory region (IMR). Secure routing hardware of the computing device 100 may prevent access to the IMR by software executed by the computing device 100.

Thus, the computing device 100 may allow the USB controller to access buffers stored in system memory while protecting the internal controller state data from modification by untrusted software. Because the processor reserved memory is protected by trusted I/O, even privileged software such as an untrusted operating system may be prevented from modifying the scratchpad buffer. Additionally, using trusted I/O may allow platform firmware such as BIOS to be removed from the trusted code base of the computing device 100. Additionally, in certain embodiments, using an isolated memory region that is protected by hardware routing support may provide protection against potential page replay or page swap attacks caused by modifying VT-d virtualization tables. Accordingly, the computing device 100 may improve USB controller security, for example by preventing untrusted software from modifying controller state to gain access to certain I/O devices.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 128, a memory 136, a data storage device 138, and one or more I/O controllers 142. Additionally, in some embodiments, one or more of the illustrative components may be incorporated in, or otherwise form a portion of, another component. For example, the memory 136, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, a cryptographic engine 124, and a cryptographic engine instruction set architecture (ISA) 126. The secure enclave support 122 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 136. The secure enclave support 122 may be embodied as a set of processor instruction extensions that allows the processor 120 to establish one or more secure enclaves in the memory 136. For example, the secure enclave support 122 may be embodied as Intel® Software Guard Extensions (SGX) technology.

The cryptographic engine 124 may be embodied as one or more hardware functional blocks (IP blocks), microcode, or other resources of the processor 120 that allows the processor 120 to perform trusted I/O (TIO) functions. For example, as described further below, the cryptographic engine 124 may perform TIO functions such as encrypting and/or decrypting DMA I/O data input from and/or output to one or more I/O devices 144. In particular, in some embodiments, plaintext I/O data may be stored in a TIO Processor Reserved Memory (TIO PRM) region that is not accessible to software of the computing device 100, and the cryptographic engine 124 may be used to encrypt the plaintext DMA I/O data and copy the encrypted data to an ordinary kernel I/O buffer. The processor 120 may also include one or more range registers or other features to protect the TIO PRM from unauthorized access.

The cryptographic engine ISA 126 may be embodied as one or more processor instructions, model-specific registers, or other processor features that allows software executed by the processor 120 to securely program and otherwise use the cryptographic engine 124 and a corresponding CID filter 132, described further below. For example, the cryptographic engine ISA 126 may include processor features to bind programming instructions to the cryptographic engine 124 and/or the CID filter 132, unwrap bound programming instructions, securely clean the TIO PRM region of the memory 136, and/or securely copy and encrypt data from the TIO PRM region to a kernel I/O buffer. In some embodiments, the cryptographic engine ISA 126 may include processor features to copy data from a TIO PRM region to a kernel I/O buffer without encryption. For example, the cryptographic engine ISA 126 may include a trusted I/O copy instruction and/or the copy and encrypt instruction may be configurable to copy without encryption.

The memory 136 may be embodied as any type of volatile or non-volatile memory or data storage capable of performing the functions described herein. In operation, the memory 136 may store various data and software used during operation of the computing device 100 such as operating systems, applications, programs, libraries, and drivers. Further, the memory 136 may also include the TIO PRM region. The memory 136 is illustratively connected with a data port 134 to send and receive data from the processor 120 and the I/O subsystem 128. Additionally or alternatively, in some embodiments, the memory 136 may be communicatively coupled to the processor 120 via the I/O subsystem 128. The I/O subsystem 128 may be embodied as circuitry and/or components to facilitate input/output operations with the processor 120, the memory 136, and other components of the computing device 100. For example, the I/O subsystem 128 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 136 may be directly coupled to the processor 120, for example via an integrated memory controller hub. The I/O subsystem 128 may further include a secure fabric 130. The secure fabric 130 provides secure routing support, which may include hardware support to ensure I/O data cannot be misrouted in the I/O subsystem 128 under the influence of rogue software. As described further below, the secure fabric 130 may be used with the CID filter 132 to provide cryptographic protection of I/O data. Additionally, in some embodiments, the I/O subsystem 128 may form a portion of a system-on-a-chip (SoC) and be incorporated, along with the processor 120, the memory 136, and other components of the computing device 100, on a single integrated circuit chip. Additionally or alternatively, in some embodiments the processor 120 may include an integrated memory controller and a system agent, which may be embodied as a logic block in which data traffic from processor cores and I/O devices converges before being sent to the memory 136.

The data storage device 138 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 140, which may be embodied as any communication circuit, device, or collection thereof, capable of enabling communications between the computing device 100 and other remote devices over a computer network (not shown). The communications subsystem 140 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The CID filter 132 may be embodied as any hardware component, functional block, logic, or other circuit that performs CID filtering function(s), including filtering I/O transactions based on CIDs inserted by the I/O controllers 142. For example, the CID filter 132 may observe DMA transactions inline, perform test(s) based on the CID and memory address included in the transaction, and drop transactions that fail the test(s). In the illustrative embodiment, the CID filter 132 is incorporated in the I/O subsystem 128. In other embodiments, the CID filter 132 may be included in one or more other components and/or in an SoC with the processor 120 and I/O subsystem 128 as a separate component.

Each of the I/O controllers 142 may be embodied as any universal serial bus (USB) controller, embedded controller, microcontroller, microprocessor, functional block, logic, or other circuit or collection of circuits capable of performing the functions described herein. In some embodiments, one or more of the I/O controllers 142 may be embedded in another component of the computing device 100 such as the I/O subsystem 128 and/or the processor 120. Additionally or alternatively, one or more of the I/O controllers 142 may be connected to the I/O subsystem 128 and/or the processor 120 via an expansion bus such as PCI Express (PCIe) or other I/O connection. As described above, the I/O controllers 142 communicate with one or more I/O devices 144, for example over a peripheral communications bus (e.g., USB, Bluetooth, etc.). The I/O devices 144 may be embodied as any I/O device, such as human interface devices, keyboards, mice, touch screens, microphones, cameras, and other input devices, as well as displays and other output devices. As described above, the I/O controllers 142 and associated DMA channels are uniquely identified using identifiers called channel identifiers (CIDs). Each I/O controller 142 may assert an appropriate CID with every DMA transaction, for example as part of a transaction layer packet (TLP) prefix, to uniquely identify the source of the DMA transaction and provide liveness protections. The CID also enables the isolation of I/O from different I/O devices 144.

Figure 2:
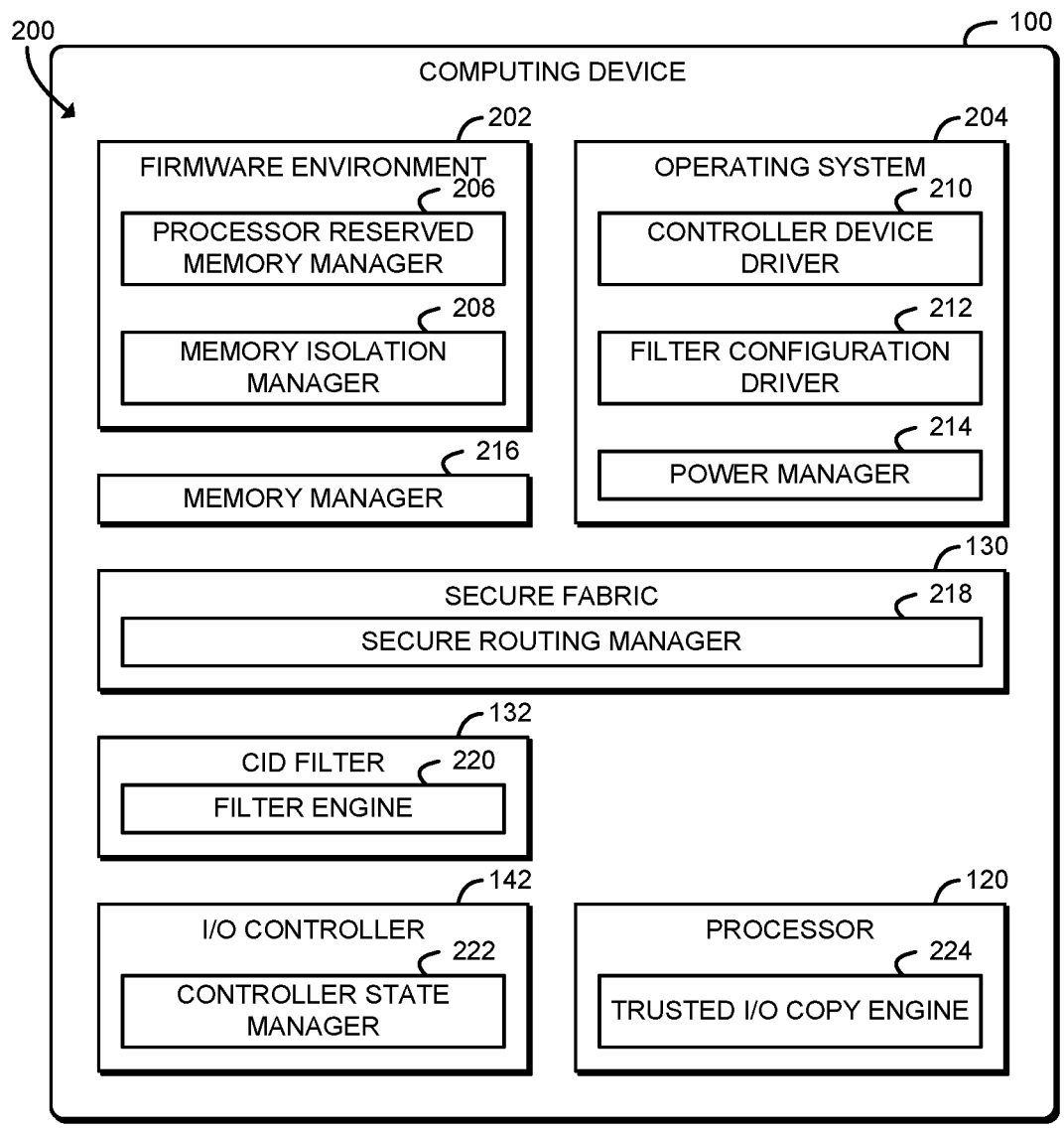
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment includes a firmware environment 202, an operating system 204, a memory manager 216, the secure fabric 130, the CID filter 132, an I/O controller 142, and the processor 120. The firmware environment 202 includes a processor reserved memory (PRM) manager 206 and a memory isolation manager 208. The operating system 204 includes a controller device driver 210, a filter configuration driver 212, and a power manager 214. The secure fabric 130 includes a secure routing manager 218. The CID filter 132 includes a filter engine 220. The I/O controller 142 includes a controller state manager 222. The processor 120 includes a trusted I/O (TIO) copy engine 224. The various components of the environment 200 may be embodied as hardware, firmware, microcode, software, or a combination thereof. As such, in some embodiments, one or more of the components of the environment 200 may be embodied as circuitry or collection of electrical devices (e.g., PRM manager circuitry 206, memory isolation manager circuitry 208, memory manager circuitry 216, controller device driver circuitry 210, filter configuration driver circuitry 212, power manager circuitry 214, secure routing manager circuitry 218, filter engine circuitry 220, controller state manager circuitry 222, and/or TIO copy engine circuitry 224). It should be appreciated that, in such embodiments, one or more of the PRM manager circuitry 206, the memory isolation manager circuitry 208, the memory manager circuitry 216, the controller device driver circuitry 210, the filter configuration driver circuitry 212, the power manager circuitry 214, the secure routing manager circuitry 218, the filter engine circuitry 220, the controller state manager circuitry 222, and/or the TIO copy engine circuitry 224 may form a portion of the processor 120, the I/O subsystem 128, the secure fabric 130, the CID filter 132, the I/O controller 142, and/or other components of the computing device 100. Additionally, in some embodiments, one or more of the illustrative components may form a portion of another component and/or one or more of the illustrative components may be independent of one another.

The firmware environment 202 may be embodied as an ACPI BIOS firmware, a UEFI firmware, or any other firmware environment executed by the processor 120 of the computing device 100. The firmware environment 202 may establish a pre-boot firmware execution environment in response to a platform reset of the computing device 100 (e.g., a cold boot, warm boot, or other platform reset). The firmware environment 202 may also install or otherwise make available one or more runtime services or other firmware methods that may be invoked by the operating system 204. The operating system 204 may be embodied as any operating system, hypervisor, virtual machine monitor, and/or other executive component of the computing device 100 that manages hardware of the computing device 100 and otherwise controls runtime execution of the computing device 100.

The controller state manager 222 is configured to generate a memory access to controller state data in a scratchpad buffer in the memory 136. The memory access includes a channel identifier (CID) associated with the I/O controller 142 and a memory address. The memory access may include a memory read or a memory write. The memory access may be generated, for example, to load the controller state data in response to the I/O controller 142 entering a full-power state.

The filter engine 220 is configured to intercept the memory access and determine whether the memory address of the memory access is included in a range of a processor reserved memory (PRM) region that is associated with the CID of the memory access. The filter engine 220 is further configured to allow the memory access if the memory address is included in the PRM region associated with the CID and to drop the memory access if not. The memory manager 216 is configured to read the controller state data from or write the controller state data to the scratchpad buffer in the memory 136 in response to allowing the memory access.

The power manager 214 is configured to cause the I/O controller 142 to enter a low-power state or a full-power state. The I/O controller 142 may be caused to enter the low-power state in response to writing the controller state data to the scratchpad buffer. The controller device driver 210 is configured to invoke a processor instruction to copy the scratchpad buffer in response to writing the controller state data. The TIO copy engine 224 of the processor 120 is configured to copy the controller state data from the scratchpad buffer to a memory buffer that is outside of the PRM region in response to invoking the processor instruction. The controller state data may be copied by microcode executed by the processor 120. The filter configuration driver 212 is configured to securely program the CID filter 132 with the CID and the associated range of the PRM region.

The PRM manager 206 is configured to configure the processor 120 to reserve the PRM region. The processor 120 is to prevent software components of the computing device 100 from accessing the PRM region in response to being configured. The memory isolation manager 208 is configured to reserve an isolated memory region (IMR) in the memory 136. The IMR includes the PRM.

The secure routing manager 218 is configured to control, by secure routing hardware of the computing device such as the secure fabric 130, access to the IMR in response to generating the memory access to the controller state data. Controlling access to the IMR may include controlling access as a function of a security attribute of an initiator (SAI) of the access to the IMR. The SAI may include an identity of the initiator or a role of the initiator (e.g., software, microcode, or other role). Controlling access to the IMR may include denying access to the IMR generated by a software component of the computing device 100.

Figure 3:
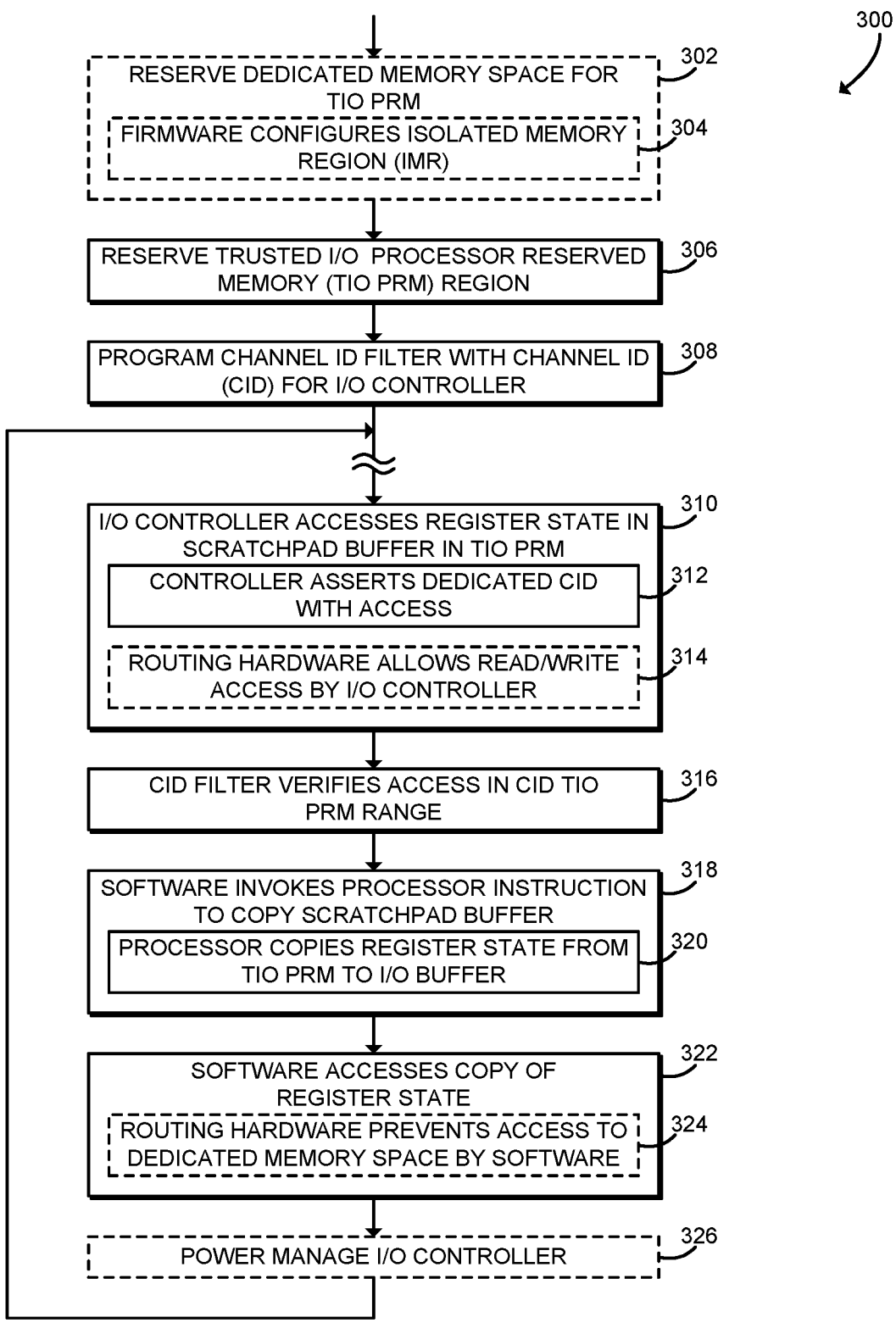
FIG. 3 is a simplified flow diagram of at least one embodiment of a method for USB controller state integrity protection with trusted I/O that may be performed by the computing device of FIGS. 1-2.

Referring now to FIG. 3, in use, the computing device 100 may execute a method 300 for USB controller state integrity protection with trusted I/O (TIO). In some embodiments, the operations of the method 300 may be performed by one or more components of the environment 200 of the computing device 100 as shown in FIG. 2. The method 300 begins in block 302, in which the computing device 100, in some embodiments, may reserve a dedicated memory region to contain the TIO processor reserved memory (PRM) region. As described further below, the TIO PRM may be used to store a controller scratchpad buffer. The computing device 100 may reserve the dedicated memory region using any technique that prevents software from modifying the dedicated memory region. In some embodiments, in block 304 the firmware environment 202 of the computing device 100 may configure an isolated memory region (IMR) to contain the controller scratchpad buffer. For example, the firmware environment 202 may configure one or more range registers or otherwise define bounds of the IMR. The IMR may be protected from unauthorized access using secure routing support of the computing device 100. For example, the secure fabric 130 may protect the IMR from unauthorized access by applying one or more security attributes of initiator (SAI) security policies.

In block 306, the computing device 100 reserves the TIO PRM region in the memory 136 using the processor 120. For example, one or more TIO PRM range registers of the processor 120 may be set to define the TIO PRM range in memory. Continuing that example, the processor 120 may include a TIO PRM base register and a TIO PRM size register, which together define the TIO PRM range. As described above, in those embodiments in which a dedicated memory region (e.g., an IMR) has been configured, the TIO PRM is included in the dedicated memory region. After reserving the TIO PRM range, the processor 120 may generate a page fault, exception, or other error in response to a software attempt to access the TIO PRM range. As another example, in some embodiments the processor 120 may prevent access to the TIO PRM range without generating an error, for example by excluding the TIO PRM from a system memory map or other memory layout of the computing device 100.

In block 308, the computing device 100 securely programs the CID filter 132 with a channel identifier (CID) that is associated with a particular I/O controller 142. As described further below, the CID is asserted by the I/O controller 142 for DMA transactions generated by the I/O controller 142 to access the scratchpad buffer and is not related to I/O data for any I/O device 144. The computing device 100 may also program the CID filter 132 with a range in the TIO PRM region associated with the CID, called a CID TIO PRM range. In response to being programmed, the CID filter 132 may store the CID, the associated CID TIO PRM range, and/or other programming data in a content-addressable memory (CAM) table. The computing device 100 may use any appropriate technique to program the CID filter 132. For example, trusted software such as a secure enclave established using the secure enclave support 122 of the processor 120 may execute an EBIND instruction to generate wrapped programming information for the CID filter 132. Untrusted software, such as the operating system 204 and/or the filter configuration driver 212 may execute an UNWRAP instruction to unwrap the wrapped programming information and securely deliver the unwrapped programming information to the CID filter 132 using the secure fabric 130.

After programming the CID filter 132, the computing device 100 continues to operate. In particular, the computing device 100 may load and execute the operating system 204 or otherwise operate normally. During operation, the I/O controller 142 may be used to communicate with one or more I/O devices 144. For example, a USB controller 142 may be used to communicate with one or more USB devices 144, such as human input devices, mass storage devices, or other USB devices.

During operation, in block 314 the I/O controller 142 accesses controller state data in the scratchpad buffer in the memory 136. The controller state data may include the contents of one or more control registers, device contexts, data structures, and/or other internal state of the I/O controller 142. The I/O controller 142 may generate one or more DMA transactions to read or write to the scratchpad buffer. For example, the I/O controller 142 may write the controller state data to prepare for entering a low power mode or otherwise store internal state of the I/O controller 142 to support core functioning of the I/O controller 142. The computing device 100 may determine to power down the I/O controller 142 in order to enter a device sleep state or other low power state, and the I/O controller 142 may store the controller state prior to entering a low power state or otherwise powering down. As another example, the I/O controller 142 may restore one or more configuration registers or other device state from the scratchpad buffer or otherwise read previously stored internal state data back from the scratchpad buffer.

In block 312, the I/O controller 142 asserts a CID with each access that is dedicated to the I/O controller 142. In particular, the I/O controller 142 asserts the same CID programmed to the CID filter 132 as described above in connection with block 308. As described above, the CID is used by the I/O controller 142 to access the scratchpad buffer and is not associated with any I/O device 144 coupled to the I/O controller 142. The I/O controller 142 may assert the CID by including metadata or other data indicative of the CID in one or more DMA transactions. For example, the CID may be included in a PCI Express transaction layer packet (TLP) prefix.

In some embodiments, in block 314, secure routing hardware of the computing device 100 may allow read/write access to the scratchpad buffer in the dedicated memory region by the I/O controller 142. For example, the secure fabric 130 may allow transactions from the I/O controller 142 to write to memory locations within an IMR that includes the TIO PRM (and therefore, the scratchpad buffer). Each transaction initiated by the I/O controller 142 may include one or more security attributes of the initiator (SAI) that identify the I/O controller 142 as the initiator of the transaction. The secure fabric 130 may use the SAI of each transaction to identify the I/O controller 142 as the initiator, and then allow the transaction to read or write to the scratchpad buffer.

In block 316, the CID filter 132 verifies that an address of the memory access generated by the I/O controller 142 is located in the CID TIO PRM range corresponding to the CID of the I/O controller 142. The CID filter 132 may, for example, intercept a DMA transaction, extract the CID from the transaction, and then look up the CID in an internal CAM table and verify the associated address. If the memory address is not within the correct CID TIO PRM range, the CID filter 132 may drop the transaction, preventing a read or write to the memory 136. In some embodiments, the CID filter 132 may also generate an error signal or other indication that the I/O transaction was dropped. If the memory access is successfully verified, the CID filter 132 allows the transaction. In response to allowing the transaction, the computing device 100 reads or writes the controller state data to the scratchpad buffer located in the CID TIO PRM range of the memory 136. Additionally, although illustrated as performing CID filtering operations after enforcing read/write access by secure routing hardware in some embodiments, it should be understood that in other embodiments the computing device 100 may perform those operations in any order and/or concurrently.

In block 318, software executed by the computing device 100 may invoke a processor instruction to copy contents of the scratchpad buffer to unprotected memory. For example, the operating system 204, controller device driver 210, and/or other software executed by the processor 120 of the computing device 100 may invoke the instruction to copy the contents of the scratchpad buffer to a buffer located outside of the TIO PRM, and, in some embodiments, also outside of the IMR. Software may execute a dedicated TIO copy instruction or may execute a TIO copy and encrypt instruction configured to disable encryption. In block 320, the processor 120 copies register state or other controller state data from the CID TIO PRM scratchpad buffer to an I/O buffer in unprotected memory, such as an ordinary kernel buffer. The copy may be performed by hardware, microcode, or other non-software resources of the processor 120. In some embodiments, when the TIO PRM is included in an IMR, secure routing hardware of the computing device 100 may allow the access to the IMR by the microcode of the processor 120. For example, the secure fabric 130 may allow transactions initiated by microcode executed by the processor 120 to read from memory locations within the IMR that includes the TIO PRM and the scratchpad buffer. Each transaction initiated by the processor 120 may include one or more security attributes of the initiator (SAI) that identify the processor 120 as the initiator of the transaction. The SAI may further identify that the transaction was generated by microcode executed by the processor 120, as opposed to transactions generated by software executed by the processor 120. The secure fabric 130 may use the SAI of each transaction to identify microcode executed by the processor 120 as the initiator, and then allow the transaction to read from the scratchpad buffer. The secure fabric 130 may deny or otherwise prohibit transactions generated by software executed by the processor 120 from reading or writing to the scratchpad buffer.

In block 322, software executed by the computing device 100 may read the copy of the controller state data stored outside of the scratchpad buffer. For example, the operating system 204, controller device driver 210, and/or other software executed by the processor 120 of the computing device 100 may read one or more saved registers, fields, or other controller state data from the copy of the scratchpad buffer. Because software accesses a copy of the controller state data, any modifications to the controller state data generated by software are not transferred back to the I/O controller 142. In block 324, in some embodiments, the secure routing hardware of the computing device 100 may prevent access to the IMR including the TIO PRM and the scratchpad buffer by the software executed by the processor 120. As described above, each transaction initiated by the processor 120 may include one or more security attributes of the initiator (SAI) that identify the processor 120 as the initiator of the transaction. The SAI may further identify that the transaction was generated by software executed by the processor 120, as opposed to transactions generated by microcode or otherwise generated by the processor 120. The secure fabric 130 may use the SAI of each transaction to identify software executed by the processor 120 as the initiator, and then prohibit the transaction from reading or writing to the IMR, including the TIO PRM and the scratchpad buffer. Thus, the secure fabric 130 may deny or otherwise prohibit transactions generated by software executed by the processor 120 from writing to the scratchpad buffer.

In block 326, the computing device 100 may power manage the I/O controller 142. For example, the computing device 100 may power down the I/O controller 142 and one or more I/O devices 144 in order to enter a system sleep state or other low-power state. As another example, the computing device 100 may subsequently power on the I/O controller 142, for example in response to leaving a system sleep state. After performing any power management, the method 300 loops back to block 310, in which the I/O controller 142 may continue to communicate with the I/O devices 144 and/or access controller state data in the scratchpad buffer.

Figure 4:
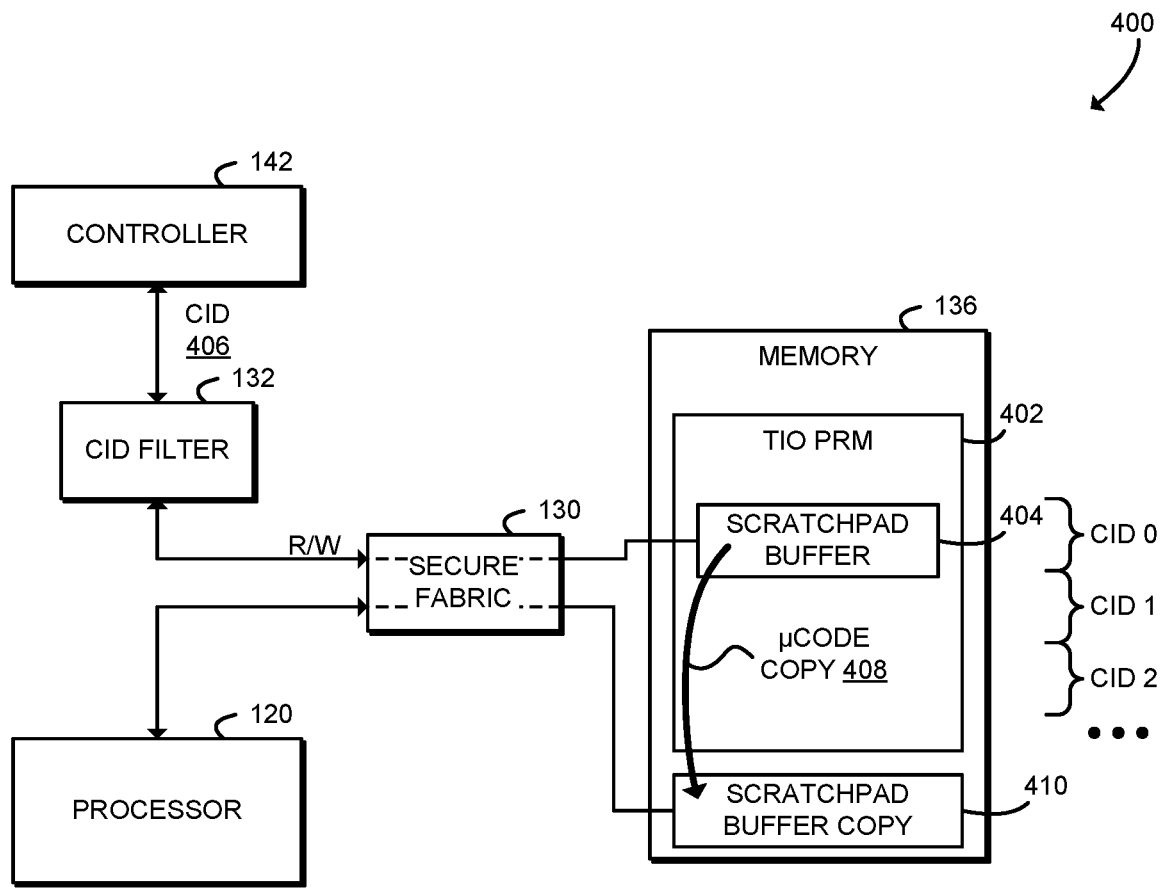
FIG. 4 is a schematic diagram illustrating trusted I/O processor reserved memory access filtering that may be performed by the computing device of FIGS. 1-2.

Referring now to FIG. 4, diagram 400 illustrates at least one potential embodiment of TIO PRM access filtering that may be performed by the computing device 100. As shown, the memory 136 includes a TIO PRM region 402. The TIO PRM region 402 is subdivided into multiple CID TIO PRM ranges. As shown, a scratchpad buffer 404 is included in the CID TIO PRM range for CID 0, which is associated with the I/O controller 142.

As shown, the controller 142 may access the memory 136 via the CID filter 132 and the secure fabric 130. The controller 142 may initiate transactions to read or write data in the scratchpad buffer 404 in the memory 136, and each transaction is tagged or otherwise identified with a CID 406. As described above, the CID filter 132 verifies that the memory address of each transaction generated by the I/O controller 142 is within the CID TIO PRM assigned to the associated CID 406. Illustratively, the CID filter 132 verifies that every transaction including the CID 406 is directed to the scratchpad buffer 404 within the CID TIO PRM for CID 0.

Software executed by the processor 120 may not access (read or write) the TIO PRM region 402, including the scratchpad buffer 404. However, microcode executed by the processor 120, for example in response to a TIO copy instruction, may access the TIO PRM region 402. As shown, the processor 120 may perform a microcode copy operation 408 to copy the contents of the scratchpad buffer 404 to a scratchpad buffer copy 410 that is located outside of the TIO PRM region 402. Software executed by the processor 120 may access (e.g., read or write) the scratchpad buffer copy 410.

Figure 5:
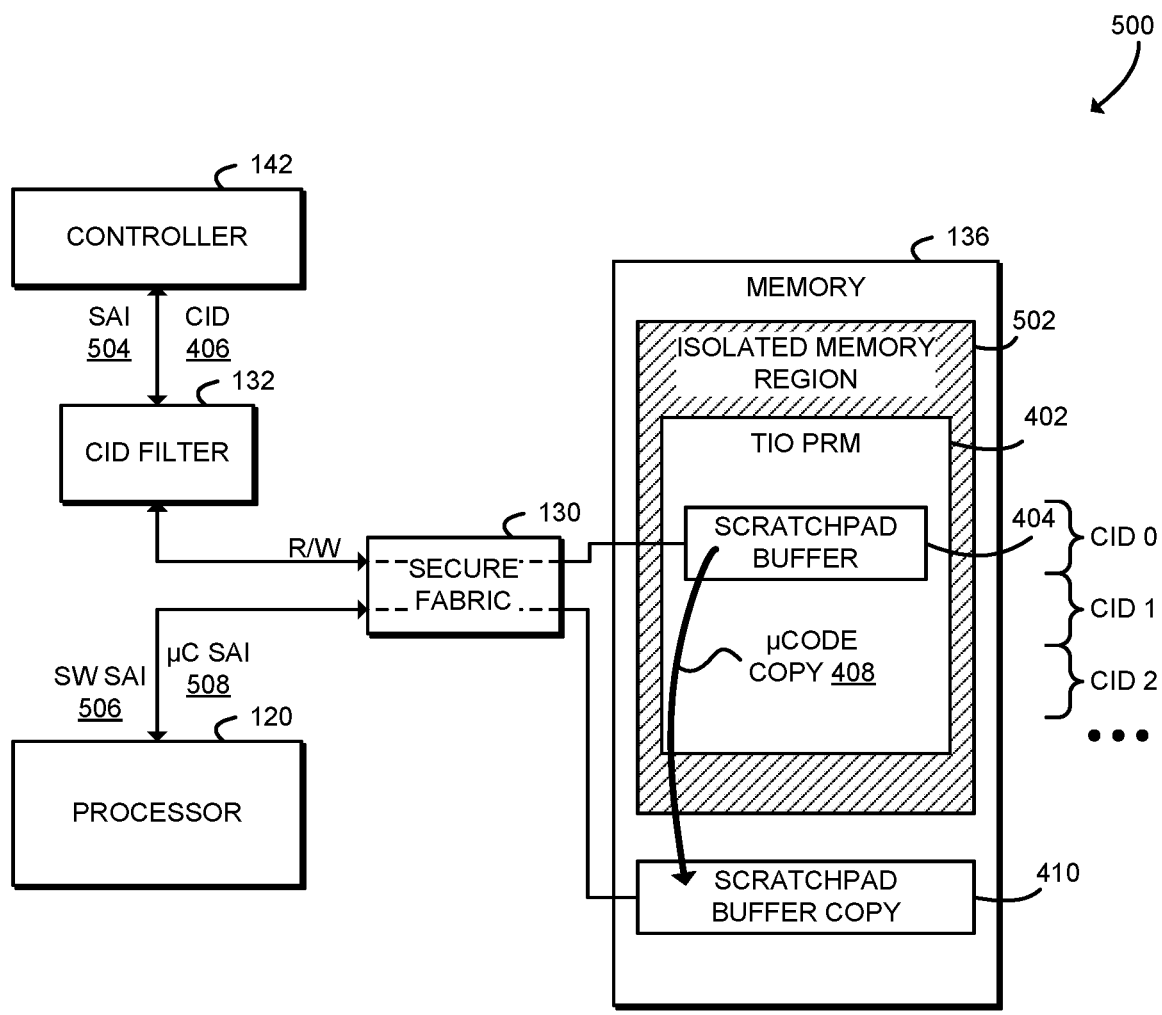
FIG. 5 is a schematic diagram illustrating trusted I/O processor reserved memory access filtering and memory isolation enforcement that may be performed by the computing device of FIGS. 1-2.

Referring now to FIG. 5, diagram 500 illustrates at least one potential embodiment of TIO PRM access filtering with memory isolation enforcement that may be performed by the computing device 100. As shown, the memory 136 includes the TIO PRM region 402 subdivided into multiple CID TIO PRM ranges as described above in connection with FIG. 4. As shown, the scratchpad buffer 404 is included in the CID TIO PRM range for CID 0, which is associated with the I/O controller 142. As further shown in FIG. 5, the memory 136 includes an isolated memory region 502 that includes the TIO PRM region 402 and the scratchpad buffer 404. As described above in connection with FIG. 4, the CID filter 132 may filter transactions generated by the controller 142 based on the CID 406 asserted in each transaction. Additionally, in some embodiments the secure fabric 130 may enforce access restrictions to the IMR 502.

As shown, the I/O controller 142 and the processor 120 may access the memory 136 via the secure fabric 130. Each of the I/O controller 142 and the processor 120 may initiate transactions to read and/or write data in the memory 136, and each transaction is tagged or otherwise identified with one or more security attributes of the initiator (SAI). As shown, the I/O controller 142 may include an SAI 504 with each transaction. The secure fabric 130 may allow read/write access to the IMR 502 for transactions identified with the SAI 504. The processor 120 may include an SAI 506 with each transaction generated by software or an SAI 508 with each transaction generated by microcode. The secure fabric may deny access to the IMR 502 for transactions identified with the SAI 506 (i.e., software transactions). The secure fabric 130 may allow read or read/write access to the IMR 502 for transactions identified with the SAI 508 (i.e., microcode transactions).

It should be appreciated that, in some embodiments, the method 300 may be embodied as various instructions stored on a computer-readable media, which may be executed by the processor 120, the I/O subsystem 128, the I/O controller 142, and/or other components of the computing device 100 to cause the computing device 100 to perform the method 300. The computer-readable media may be embodied as any type of media capable of being read by the computing device 100 including, but not limited to, the memory 136, the data storage device 138, firmware devices, other memory or data storage devices of the computing device 100, portable media readable by a peripheral device 144 of the computing device 100, and/or other media.

EXAMPLES

Illustrative examples of the technologies disclosed herein are provided below. An embodiment of the technologies may include any one or more, and any combination of, the examples described below.

Example 1 includes a computing device for integrity protection of controller state, the computing device comprising: an I/O controller that includes a controller state manager to generate a memory access to controller state data in a scratchpad buffer, wherein the memory access comprises a channel identifier associated with the I/O controller and a memory address; and a channel identifier filter that includes a filter engine to (i) intercept the memory access, (ii) determine whether the memory address of the memory access is included in a first range of a processor reserved memory region in response to interception of the memory access, wherein the first range is associated with the channel identifier; and (iii) allow the memory access in response to a determination that the memory address is included in the processor reserved memory region.

Example 2 includes the subject matter of Example 1, and wherein the memory access comprises a memory read, wherein the computing device further comprises a memory manager to read the controller state data from the scratchpad buffer in response to allowance of the memory access.

Example 3 includes the subject matter of any of Examples 1 and 2, and further comprising: a power manager to cause the I/O controller to enter a full-power state; wherein to generate the memory access comprises to load the controller state data in response to causing of the I/O controller to enter the full-power state.

Example 4 includes the subject matter of any of Examples 1-3, and wherein the memory access comprises a memory write, wherein the computing device further comprises a memory manager to write the controller state data to the scratchpad buffer in response to allowance of the memory access.

Example 5 includes the subject matter of any of Examples 1-4, and further comprising a power manager to cause the I/O controller to enter a low-power state in response to writing of the controller state data to the scratchpad buffer.

Example 6 includes the subject matter of any of Examples 1-5, and further comprising: a controller device driver to invoke a processor instruction to copy the scratchpad buffer in response to writing of the controller state data; and a processor that includes a copy engine to copy the controller state data from the scratchpad buffer to a memory buffer that is outside of the processor reserved memory region in response to invocation of the processor instruction.

Example 7 includes the subject matter of any of Examples 1-6, and wherein to copy the controller state data comprises to copy, by microcode executed by the processor, the controller state data from the scratchpad buffer to the memory buffer.

Example 8 includes the subject matter of any of Examples 1-7, and wherein the filter engine is further to drop the memory access in response to a determination that the memory address is not included in the first range of the processor reserved memory region.

Example 9 includes the subject matter of any of Examples 1-8, and further comprising a filter configuration driver to securely program the channel identifier filter with the channel identifier and the first range of the processor reserved memory region, wherein to generate the memory access comprises to generate the memory access in response to secure programming of the channel identifier filter.

Example 10 includes the subject matter of any of Examples 1-9, and further comprising a firmware environment to configure a processor of the computing device to reserve the processor reserved memory region, wherein to generate the memory access further comprises to generate the memory access in response to configuration of the processor to reserve the processor reserved memory region.

Example 11 includes the subject matter of any of Examples 1-10, and wherein the processor is to prevent a software component of the computing device from accessing the processor reserved memory region in response to the configuration of the processor.

Example 12 includes the subject matter of any of Examples 1-11, and wherein the I/O controller comprises a USB controller.

Example 13 includes the subject matter of any of Examples 1-12, and further comprising: a memory isolation manager to reserve an isolated memory region in a memory of the computing device, wherein the isolated memory region includes the processor reserved memory region; and a secure routing manager to control, by secure routing hardware of the computing device, access to the isolated memory region in response to generation of the memory access to the controller state data.

Example 14 includes the subject matter of any of Examples 1-13, and wherein to control the access to the isolated memory region comprises to control the access as a function of a security attribute of an initiator of the access to the isolated memory region.

Example 15 includes the subject matter of any of Examples 1-14, and wherein the security attribute of the initiator comprises an identity of the initiator.

Example 16 includes the subject matter of any of Examples 1-15, and wherein the security attribute of the initiator comprises a role of the initiator.

Example 17 includes the subject matter of any of Examples 1-16, and wherein to control the access to the isolated memory region comprises to allow write access to the isolated memory region by the I/O controller.

Example 18 includes the subject matter of any of Examples 1-17, and wherein to control the access to the isolated memory region comprises to deny access to the isolated memory region by a software component of the computing device.

Example 19 includes the subject matter of any of Examples 1-18, and wherein to reserve the isolated memory region comprises to configure the isolated memory region by a firmware environment of the computing device.

Example 20 includes a method for integrity protection of controller state, the method comprising: generating, by an I/O controller of a computing device, a memory access to controller state data in a scratchpad buffer, wherein the memory access comprises a channel identifier associated with the I/O controller and a memory address; intercepting, by a channel identifier filter of the computing device, the memory access; determining, by the channel identifier filter, whether the memory address of the memory access is included in a first range of a processor reserved memory region in response to intercepting the memory access, wherein the first range is associated with the channel identifier; and allowing, by the channel identifier filter, the memory access in response to determining that the memory address is included in the processor reserved memory region.

Example 21 includes the subject matter of Example 20, and wherein the memory access comprises a memory read, wherein the method further comprises reading, by the computing device, the controller state data from the scratchpad buffer in response to allowing the memory access.

Example 22 includes the subject matter of any of Examples 20 and 21, and further comprising: causing, by the computing device, the I/O controller to enter a full-power state; wherein generating the memory access comprises loading the controller state data in response to causing the I/O controller to enter the full-power state.

Example 23 includes the subject matter of any of Examples 20-22, and wherein the memory access comprises a memory write, wherein the method further comprises writing, by the computing device, the controller state data to the scratchpad buffer in response to allowing the memory access.

Example 24 includes the subject matter of any of Examples 20-23, and further comprising: causing, by the computing device, the I/O controller to enter a low-power state in response to writing the controller state data to the scratchpad buffer.

Example 25 includes the subject matter of any of Examples 20-24, and further comprising: invoking, by the computing device, a processor instruction to copy the scratchpad buffer in response to writing the controller state data; and copying, by a processor of the computing device, the controller state data from the scratchpad buffer to a memory buffer that is outside of the processor reserved memory region in response to invoking the processor instruction.

Example 26 includes the subject matter of any of Examples 20-25, and wherein copying the controller state data comprises copying, by microcode executed by the processor, the controller state data from the scratchpad buffer to the memory buffer.

Example 27 includes the subject matter of any of Examples 20-26, and further comprising dropping, by the channel identifier filter, the memory access in response to determining that the memory address is not included in the first range of the processor reserved memory region.

Example 28 includes the subject matter of any of Examples 20-27, and further comprising securely programming, by the computing device, the channel identifier filter with the channel identifier and the first range of the processor reserved memory region, wherein generating the memory access comprises generating the memory access in response to securely programming the channel identifier filter.

Example 29 includes the subject matter of any of Examples 20-28, and further comprising configuring, by the computing device, a processor of the computing device to reserve the processor reserved memory region, wherein generating the memory access further comprises generating the memory access in response to configuring the processor to reserve the processor reserved memory region.

Example 30 includes the subject matter of any of Examples 20-29, and further comprising preventing, by a processor of the computing device, a software component of the computing device from accessing the processor reserved memory region in response to configuring the processor.

Example 31 includes the subject matter of any of Examples 20-30, and wherein the I/O controller comprises a USB controller.

Example 32 includes the subject matter of any of Examples 20-31, and further comprising: reserving, by the computing device, an isolated memory region in a memory of the computing device, wherein the isolated memory region includes the processor reserved memory region; and controlling, by secure routing hardware of the computing device, access to the isolated memory region in response to generating the memory access to the controller state data.

Example 33 includes the subject matter of any of Examples 20-32, and wherein controlling the access to the isolated memory region comprises controlling the access as a function of a security attribute of an initiator of the access to the isolated memory region.

Example 34 includes the subject matter of any of Examples 20-33, and wherein the security attribute of the initiator comprises an identity of the initiator.

Example 35 includes the subject matter of any of Examples 20-34, and wherein the security attribute of the initiator comprises a role of the initiator.

Example 36 includes the subject matter of any of Examples 20-35, and wherein controlling the access to the isolated memory region comprises allowing write access to the isolated memory region by the I/O controller.

Example 37 includes the subject matter of any of Examples 20-36, and wherein controlling the access to the isolated memory region comprises denying access to the isolated memory region by a software component of the computing device.

Example 38 includes the subject matter of any of Examples 20-37, and wherein reserving the isolated memory region comprises configuring the isolated memory region by a firmware environment of the computing device.

Example 39 includes a computing device comprising: a processor; and a memory having stored therein a plurality of instructions that when executed by the processor cause the computing device to perform the method of any of Examples 20-38.

Example 40 includes one or more non-transitory, computer readable storage media comprising a plurality of instructions stored thereon that in response to being executed result in a computing device performing the method of any of Examples 20-38.

Example 41 includes a computing device comprising means for performing the method of any of Examples 20-38.

Example 42 includes a computing device for integrity protection of controller state, the computing device comprising: means for generating, by an I/O controller of the computing device, a memory access to controller state data in a scratchpad buffer, wherein the memory access comprises a channel identifier associated with the I/O controller and a memory address; means for intercepting, by a channel identifier filter of the computing device, the memory access; means for determining, by the channel identifier filter, whether the memory address of the memory access is included in a first range of a processor reserved memory region in response to intercepting the memory access, wherein the first range is associated with the channel identifier; and means for allowing, by the channel identifier filter, the memory access in response to determining that the memory address is included in the processor reserved memory region.

Example 43 includes the subject matter of Example 42, and wherein the memory access comprises a memory read, wherein the computing device further comprises means for reading the controller state data from the scratchpad buffer in response to allowing the memory access.

Example 44 includes the subject matter of any of Examples 42 and 43, and further comprising: means for causing the I/O controller to enter a full-power state; wherein the means for generating the memory access comprises means for loading the controller state data in response to causing the I/O controller to enter the full-power state.

Example 45 includes the subject matter of any of Examples 42-44, and wherein the memory access comprises a memory write, wherein the computing device further comprises means for writing the controller state data to the scratchpad buffer in response to allowing the memory access.

Example 46 includes the subject matter of any of Examples 42-45, and further comprising means for causing the I/O controller to enter a low-power state in response to writing the controller state data to the scratchpad buffer.

Example 47 includes the subject matter of any of Examples 42-46, and further comprising: means for invoking a processor instruction to copy the scratchpad buffer in response to writing the controller state data; and means for copying, by a processor of the computing device, the controller state data from the scratchpad buffer to a memory buffer that is outside of the processor reserved memory region in response to invoking the processor instruction.

Example 48 includes the subject matter of any of Examples 42-47, and wherein the means for copying the controller state data comprises means for copying, by microcode executed by the processor, the controller state data from the scratchpad buffer to the memory buffer.

Example 49 includes the subject matter of any of Examples 42-48, and further comprising means for dropping, by the channel identifier filter, the memory access in response to determining that the memory address is not included in the first range of the processor reserved memory region.

Example 50 includes the subject matter of any of Examples 42-49, and further comprising means for securely programming the channel identifier filter with the channel identifier and the first range of the processor reserved memory region, wherein the means for generating the memory access comprises means for generating the memory access in response to securely programming the channel identifier filter.

Example 51 includes the subject matter of any of Examples 42-50, and further comprising means for configuring a processor of the computing device to reserve the processor reserved memory region, wherein the means for generating the memory access further comprises means for generating the memory access in response to configuring the processor to reserve the processor reserved memory region.

Example 52 includes the subject matter of any of Examples 42-51, and further comprising means for preventing, by a processor of the computing device, a software component of the computing device from accessing the processor reserved memory region in response to configuring the processor.

Example 53 includes the subject matter of any of Examples 42-52, and wherein the I/O controller comprises a USB controller.

Example 54 includes the subject matter of any of Examples 42-53, and further comprising: means for reserving an isolated memory region in a memory of the computing device, wherein the isolated memory region includes the processor reserved memory region; and means for controlling, by secure routing hardware of the computing device, access to the isolated memory region in response to generating the memory access to the controller state data.

Example 55 includes the subject matter of any of Examples 42-54, and wherein the means for controlling the access to the isolated memory region comprises means for controlling the access as a function of a security attribute of an initiator of the access to the isolated memory region.

Example 56 includes the subject matter of any of Examples 42-55, and wherein the security attribute of the initiator comprises an identity of the initiator.

Example 57 includes the subject matter of any of Examples 42-56, and wherein the security attribute of the initiator comprises a role of the initiator.

Example 58 includes the subject matter of any of Examples 42-57, and wherein the means for controlling the access to the isolated memory region comprises means for allowing write access to the isolated memory region by the I/O controller.

Example 59 includes the subject matter of any of Examples 42-58, and wherein the means for controlling the access to the isolated memory region comprises means for denying access to the isolated memory region by a software component of the computing device.

Example 60 includes the subject matter of any of Examples 42-59, and wherein the means for reserving the isolated memory region comprises means for configuring the isolated memory region by a firmware environment of the computing device.

The invention claimed is:

1. A computing device for integrity protection of controller state, the computing device comprising:
   an I/O controller that includes a controller state manager to generate a transaction layer packet for a memory access to controller state data in a scratchpad buffer, wherein the memory access comprises a channel identifier associated with the I/O controller and a memory address, wherein the channel identifier is included in metadata of the memory access, wherein the channel identifier is separate from the memory address, and wherein the channel identifier is asserted in a prefix of the transaction layer packet; and
   a channel identifier filter that includes a filter engine to (i) intercept the memory access, (ii) determine whether the memory address of the memory access is included in a first range of a processor reserved memory region in response to interception of the memory access, wherein the first range is associated with the channel identifier; and (iii) allow the memory access in response to a determination that the memory address is included in the processor reserved memory region.

2. The computing device of claim 1, wherein the memory access comprises a memory read, wherein the computing device further comprises a memory manager to read the controller state data from the scratchpad buffer in response to allowance of the memory access.

3. The computing device of claim 1, wherein the memory access comprises a memory write, wherein the computing device further comprises a memory manager to write the controller state data to the scratchpad buffer in response to allowance of the memory access.

4. The computing device of claim 3, further comprising a power manager to cause the I/O controller to enter a low-power state in response to writing of the controller state data to the scratchpad buffer.

5. The computing device of claim 3, further comprising:
   a controller device driver to invoke a processor instruction to copy the scratchpad buffer in response to writing of the controller state data; and
   a processor that includes a copy engine to copy the controller state data from the scratchpad buffer to a memory buffer that is outside of the processor reserved memory region in response to invocation of the processor instruction.

6. The computing device of claim 5, wherein to copy the controller state data comprises to copy, by microcode executed by the processor, the controller state data from the scratchpad buffer to the memory buffer.

7. The computing device of claim 1, wherein the filter engine is further to drop the memory access in response to a determination that the memory address is not included in the first range of the processor reserved memory region.

8. The computing device of claim 1, further comprising a filter configuration driver to securely program the channel identifier filter with the channel identifier and the first range of the processor reserved memory region, wherein to generate the memory access comprises to generate the memory access in response to secure programming of the channel identifier filter.

9. The computing device of claim 1, wherein the I/O controller comprises a USB controller.

10. The computing device of claim 1, further comprising:
    a memory isolation manager to reserve an isolated memory region in a memory of the computing device, wherein the isolated memory region includes the processor reserved memory region; and
    a secure routing manager to control, by secure routing hardware of the computing device, access to the isolated memory region in response to generation of the memory access to the controller state data.

11. The computing device of claim 10, wherein to control the access to the isolated memory region comprises to control the access as a function of a security attribute of an initiator of the access to the isolated memory region.

12. A method for integrity protection of controller state, the method comprising:
    generating, by an I/O controller of a computing device, a transaction layer packet for a memory access to controller state data in a scratchpad buffer, wherein the memory access comprises a channel identifier associated with the I/O controller and a memory address, wherein the channel identifier is included in metadata of the memory access, wherein the channel identifier is separate from the memory address, and wherein the channel identifier is asserted in a prefix of the transaction layer packet;
    intercepting, by a channel identifier filter of the computing device, the memory access;
    determining, by the channel identifier filter, whether the memory address of the memory access is included in a first range of a processor reserved memory region in response to intercepting the memory access, wherein the first range is associated with the channel identifier; and
    allowing, by the channel identifier filter, the memory access in response to determining that the memory address is included in the processor reserved memory region.

13. The method of claim 12, wherein the memory access comprises a memory read, wherein the method further comprises reading, by the computing device, the controller state data from the scratchpad buffer in response to allowing the memory access.

14. The method of claim 12, wherein the memory access comprises a memory write, wherein the method further comprises writing, by the computing device, the controller state data to the scratchpad buffer in response to allowing the memory access.

15. The method of claim 14, further comprising:
    invoking, by the computing device, a processor instruction to copy the scratchpad buffer in response to writing the controller state data; and
    copying, by a processor of the computing device, the controller state data from the scratchpad buffer to a memory buffer that is outside of the processor reserved memory region in response to invoking the processor instruction.

16. The method of claim 12, further comprising dropping, by the channel identifier filter, the memory access in response to determining that the memory address is not included in the first range of the processor reserved memory region.

17. The method of claim 12, further comprising:
    reserving, by the computing device, an isolated memory region in a memory of the computing device, wherein the isolated memory region includes the processor reserved memory region; and controlling, by secure routing hardware of the computing device, access to the isolated memory region in response to generating the memory access to the controller state data.

18. The method of claim 17, wherein controlling the access to the isolated memory region comprises controlling the access as a function of a security attribute of an initiator of the access to the isolated memory region.

19. One or more non-transitory, computer-readable storage media comprising a plurality of instructions stored thereon that, in response to being executed, cause a computing device to:

generate, by an I/O controller of the computing device, a transaction layer packet for a memory access to controller state data in a scratchpad buffer, wherein the memory access comprises a channel identifier associated with the I/O controller and a memory address, wherein the channel identifier is included in metadata of the memory access, and wherein the channel identifier is separate from the memory address, and wherein the channel identifier is asserted in a prefix of the transaction layer packet;

intercept, by a channel identifier filter of the computing device, the memory access;

determine, by the channel identifier filter, whether the memory address of the memory access is included in a first range of a processor reserved memory region in response to intercepting the memory access, wherein the first range is associated with the channel identifier; and allow, by the channel identifier filter, the memory access in response to determining that the memory address is included in the processor reserved memory region.

20. The one or more non-transitory, computer-readable storage media of claim 19, wherein the memory access comprises a memory read, wherein the one or more computer-readable storage media further comprises a plurality of instructions stored thereon that, in response to being executed, cause the computing device to read the controller state data from the scratchpad buffer in response to allowing the memory access.

21. The one or more non-transitory, computer-readable storage media of claim 19, wherein the memory access comprises a memory write, wherein the one or more computer-readable storage media further comprises a plurality of instructions stored thereon that, in response to being executed, cause the computing device to write the controller state data to the scratchpad buffer in response to allowing the memory access.

22. The one or more non-transitory, computer-readable storage media of claim 21, further comprising a plurality of instructions stored thereon that, in response to being executed, cause the computing device to:

invoke a processor instruction to copy the scratchpad buffer in response to writing the controller state data; and copy, by a processor of the computing device, the controller state data from the scratchpad buffer to a memory buffer that is outside of the processor reserved memory region in response to invoking the processor instruction.

23. The one or more non-transitory, computer-readable storage media of claim 19, further comprising a plurality of instructions stored thereon that, in response to being executed, cause the computing device to drop, by the channel identifier filter, the memory access in response to determining that the memory address is not included in the first range of the processor reserved memory region.

24. The one or more non-transitory, computer-readable storage media of claim 19, further comprising a plurality of instructions stored thereon that, in response to being executed, cause the computing device to:

reserve an isolated memory region in a memory of the computing device, wherein the isolated memory region includes the processor reserved memory region; and control, by secure routing hardware of the computing device, access to the isolated memory region in response to generating the memory access to the controller state data.

25. The one or more non-transitory, computer-readable storage media of claim 24, wherein to control the access to the isolated memory region comprises to control the access as a function of a security attribute of an initiator of the access to the isolated memory region.

* * * * *